United States Patent [19]
Enoki et al.

[11] Patent Number: 5,734,839
[45] Date of Patent: Mar. 31, 1998

[54] POS SYSTEM WITH CUSTOMER TERMINAL

[75] Inventors: Shigeki Enoki; Kazuhito Sakai; Chizuo Suzuki; Chizu Shimizu, all of Kawasaki; Kaoru Kikuchi, Hachioji, all of Japan

[73] Assignee: Fujitsu Limited, Kawasaki, Japan

[21] Appl. No.: 251,286

[22] Filed: May 31, 1994

[30] Foreign Application Priority Data

Aug. 30, 1993 [JP] Japan ................. 5-213600

[51] Int. Cl.⁶ .................................... G06K 15/00
[52] U.S. Cl. .................................... 395/220
[58] Field of Search .................. 364/405, 401, 364/408; 186/1 R, 62, 59; 235/383, 385; 340/825.35, 825.54, 825.55; 395/200, 216, 220, 221, 222

[56] References Cited

U.S. PATENT DOCUMENTS

| | | | |
|---|---|---|---|
| 4,843,546 | 6/1989 | Yoshida et al. | 364/403 |
| 4,882,724 | 11/1989 | Vela et al. | 364/401 |
| 4,888,709 | 12/1989 | Revesz et al. | 364/518 |
| 4,929,819 | 5/1990 | Collins, Jr. | 235/383 |
| 4,973,952 | 11/1990 | Malec et al. | 340/825.35 |
| 5,158,310 | 10/1992 | Tannehill et al. | 280/33.992 |
| 5,250,789 | 10/1993 | Johnsen | 235/383 |
| 5,361,871 | 11/1994 | Gupta et al. | 186/61 |
| 5,382,779 | 1/1995 | Guta et al. | 235/383 |

FOREIGN PATENT DOCUMENTS

| | | |
|---|---|---|
| 58-096367 | 6/1983 | Japan . |
| 4-293198 | 10/1992 | Japan . |

*Primary Examiner*—Gail O. Hayes
*Assistant Examiner*—Junghoon Kenneth Oh
*Attorney, Agent, or Firm*—Staas & Halsey

[57] ABSTRACT

A Point of Sale (POS) system includes a portable terminal for a customer and an adjustment POS terminal connected to the portable terminal in a retail store. The portable terminal includes an input unit for inputting article codes corresponding to goods selected by a customer and a local price look-up (PLU) file for storing main article codes. A retrieval unit retrieves the article information from the local PLU file in accordance with the article code input through the input unit, and a calculation unit performs calculation processes in accordance with the result of retrieval by the retrieval unit. A display unit then displays the article information and a result of calculation by the calculation unit. A storage unit stores the article information and a result of calculation by the calculation unit. A communication unit sends the article information which is temporarily stored in the storage unit to the adjustment POS terminal. The adjustment terminal includes a communication unit for receiving the article information which is sent from the portable terminal, and a calculation unit for performing adjustment processes in accordance with the article information received.

12 Claims, 18 Drawing Sheets

Fig.6

```
         ××YR ×MO ××DY           2:30 P.M.
         MEMBER NO ××××  Mr.○○○○

533   BEER                         ¥222
   532   CHEESE                       ¥399
   532   CHEESE                       ¥399
   511   SAUSAGE                      ¥168
   511   PEANUT                       ¥178
   526   TEMPURA                      ¥598
   524   TOFU                         ¥280
         ─────────────────────────────────
         SUBTOTAL                   ¥2,244
         TAX                            67
         TOTAL                      ¥2,311
```

[ ⇧ ] [ ⇩ ]          [ FINISH ] [ CANCEL ]

Fig.10

```
         ××YR ×MO ××DY           2:30 P.M.
         MEMBER NO ×××× Mr.○○○○

533   BEER                         ¥222
   532   CHEESE                       ¥399
   532   CHEESE                       ¥399
   511   SAUSAGE                      ¥168
   511   PEANUT                       ¥178
   526   TEMPURA                      ¥598
   524   TOFU                         ¥280
   622                          **********
         ─────────────────────────────────
         SUBTOTAL                  ¥2,244★
         TAX                            67
         TOTAL                     ¥2,311★

★ THERE ARE GOODS
        WHICH CANNOT DISPLAY PRICE
```

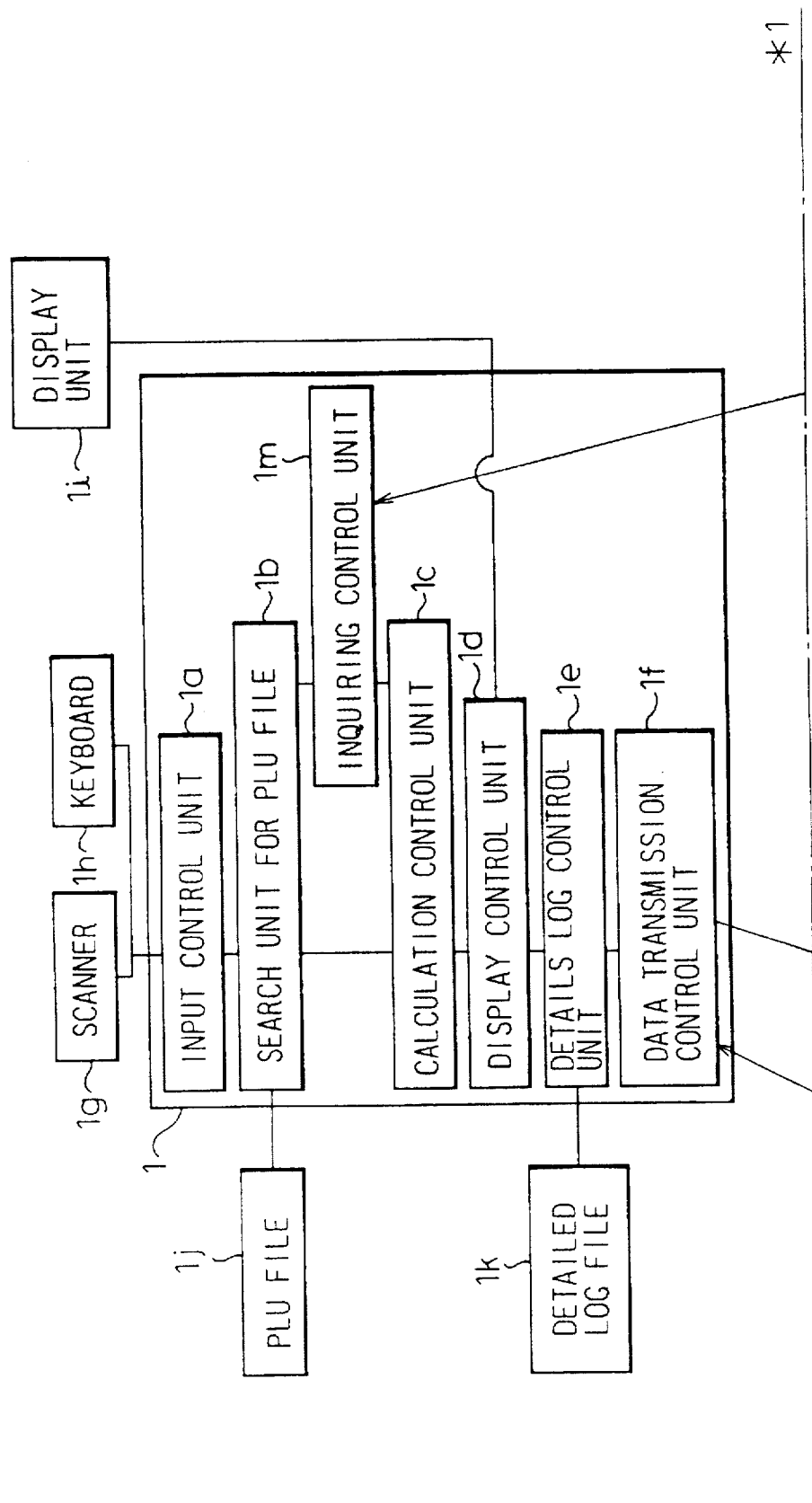

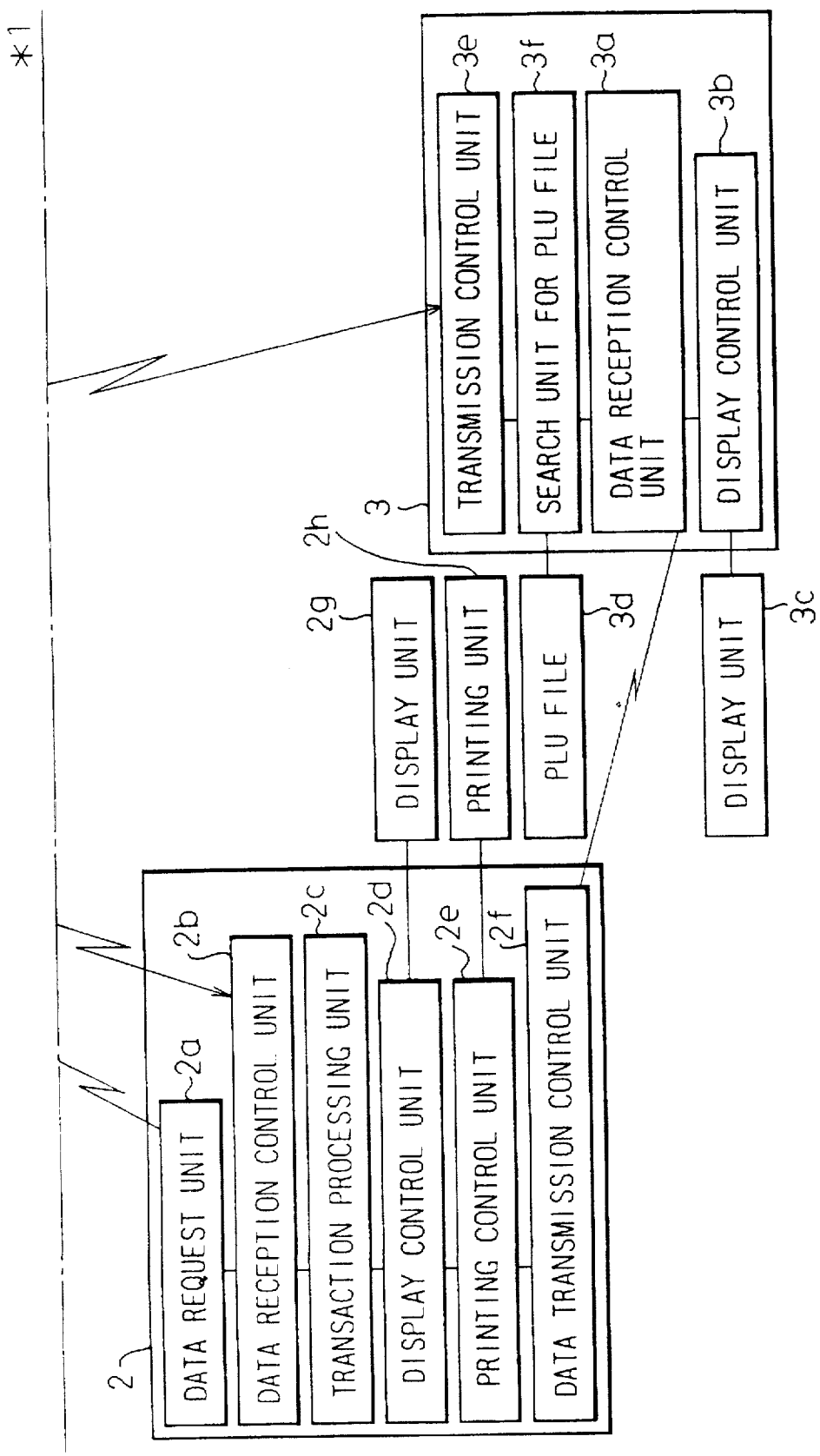

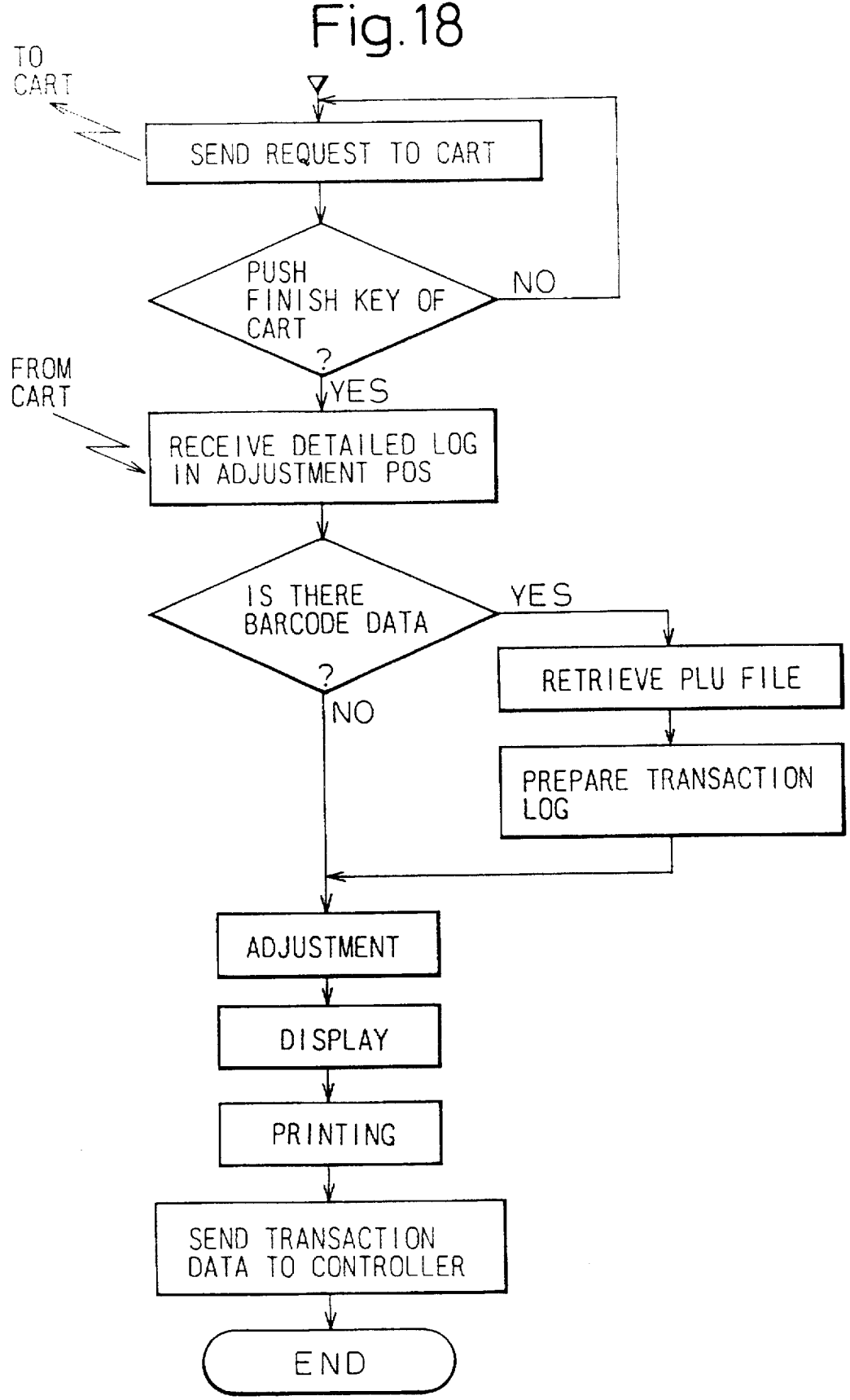

POS SYSTEM WITH CUSTOMER TERMINAL

BACKGROUND OF THE INVENTION

1. Field of the Invention

The present invention relates to a POS (Point of Sale) system used in a large store, such as a supermarket or a department store. The POS system according to the present invention utilizes a "self-scan cart" (or "self-scan basket") which includes terminal equipment (below, terminal) handled by a customer. The self-scan cart according to the present invention is defined as a shopping cart with a terminal for a customer so that the cart can be utilized as a type of terminal of the POS system. The self-scan cart according to the present invention has three representative functions, i.e., a self-retrieval function, an error processing function and an inquiry function which are executed by a controller as explained in detail below.

2. Description of the Related Art

Recently, POS systems have been widely utilized in supermarkets having large sales-spaces and handling many kinds of goods. In general, a POS system is a type of sales system which utilizes a computer system. This system is structured by a plurality of terminals, which are usually called "cash registers," and a host computer which is provided in a store or a head office.

In this system, the terminal detects various information which are included in a barcode on each article, for example, a name of a store, a name of an article, a kind of the article, a unit price, etc., and simultaneously transfers these information to the host computer. Accordingly, it is very easy to perform timely management of sales and commodities using the POS system.

Recently, some conventional arts, for example, JPP-58-96367, JPP-63-145591, JPP-63-223998 and JPP-4-293198, have been proposed as the self-scan cart or the self-scan basket in order to solve a customer's waiting time in the terminal. In the conventional art, JPP-58-96367 and JPP-4-293198 disclose the self-scan cart, and JPP-63-145591 and JPP-63-223998 disclose the self-scan basket.

The most important difference between the present invention and the conventional art lies in a PLU (price look up) function. That is, the conventional arts includes only a local PLU function which is provided in the self-scan cart or basket itself. Further, the conventional art has no self-retrieval function, error processing function and inquiry function to a controller as provided in the present invention. Since the above functions are not provided in the conventional art, it is difficult to improve the efficiency of the POS system.

Accordingly, the present invention aims to provide an improved POS system using the self-scan cart or self-scan basket. Particularly, the POS system according to the present invention includes the self-retrieval/error processing/inquiry functions so that it is possible to considerably reduce various loads (for example, inquiry of goods, calculation of subtotal and total prices, error correction, etc.) to be executed in the host computer. As a result, it is possible for a customer to have a pleasant shopping experience without undue waiting time at the terminal.

SUMMARY OF THE INVENTION

An object of the present invention is to provide a POS system having an improved self-retrieval function.

A further object of the present invention is to provide a POS system having an improved error processing function.

Yet another object of the present invention is to provide a POS system having an improved inquiry function to a controller.

In accordance with the present invention, there is provided a POS (Point of Sale) system comprising a portable terminal for a customer, and a first upper apparatus operatively connected to the portable terminal and provided as an adjustment POS terminal in the store; the portable terminal including;

an input unit for inputting an article code of goods by the customer, a local price look-up (PLU) file storing main or popular article codes and article information for each article code, a retrieval unit for retrieving the article information from the local PLU file in accordance with the article code input through the input unit, a calculation unit for performing calculation process in accordance with the result of a retrieval by the retrieval unit, a display unit for displaying the article information and the result of a calculation by the calculation unit, a storage unit for storing the article information and the result of a calculation by the calculation unit, and a communication unit for sending the article information which are temporarily stored in the storage unit to the first upper apparatus;

the first upper apparatus including;

a communication unit for receiving the article information which is sent from the portable terminal, and calculation unit for performing an adjustment process in accordance with the article information received.

In one preferred embodiment, the portable terminal is provided on a shopping cart which is handled by the customer within the store.

In another preferred embodiment, the portable terminal is provided on a shopping basket which is carried by the customer within the store.

In still another preferred embodiment, the portable terminal further comprises an error processing unit, and when the article information cannot be retrieved based on a result of retrieval of the local PLU file of the portable terminal, the display unit displays a comment indicating that the retrieval is not performed, further, the storage unit stores the corresponding article code in which the retrieval is not performed under the retrieval error.

In still another preferred embodiment, the POS system further comprises a second upper apparatus operated as a controller, and the portable terminal comprises an inquiry unit for sending the article code which corresponds to the retrieval error from the local PLU file to the second upper apparatus to check the corresponding article code.

In still another preferred embodiment, the second upper apparatus comprises a master PLU file for storing all article information for all goods in the store, a retrieval unit for retrieving the master PLU file in accordance with the inquiry request from the portable terminal, and a communication unit for sending the result of the retrieval from the master PLU file to the portable terminal in order to display the result on the display means.

In still another preferred embodiment, the input unit is a barcode scanner and a keyboard both operated by the customer.

In still another preferred embodiment, the communication between the portable terminal and the first upper apparatus is performed by a wireless or an infrared-ray communication system, or by optical fibers connected therebetween.

In still another preferred embodiment, the communication between the first upper apparatus and the second upper apparatus is performed by a wireless communication system, and the communication between the portable terminal and the second upper apparatus is performed by the wireless communication system.

BRIEF DESCRIPTION OF THE DRAWINGS

In the drawings:

FIG. 6 shows one example of display image on the self-scan cart shown in FIG. 3;

FIG. 10 shows one example of a display image on the self-scan cart in FIG. 9;

FIGS. 15A and 15B are overall block diagrams of the POS system having the inquiry function to the controller shown in FIG. 13;

FIG. 18 is a process flowchart of the POS system having the inquiry function to the controller as still another embodiment of FIG. 13.

DESCRIPTION OF THE PREFERRED EMBODIMENTS

Figure 1:
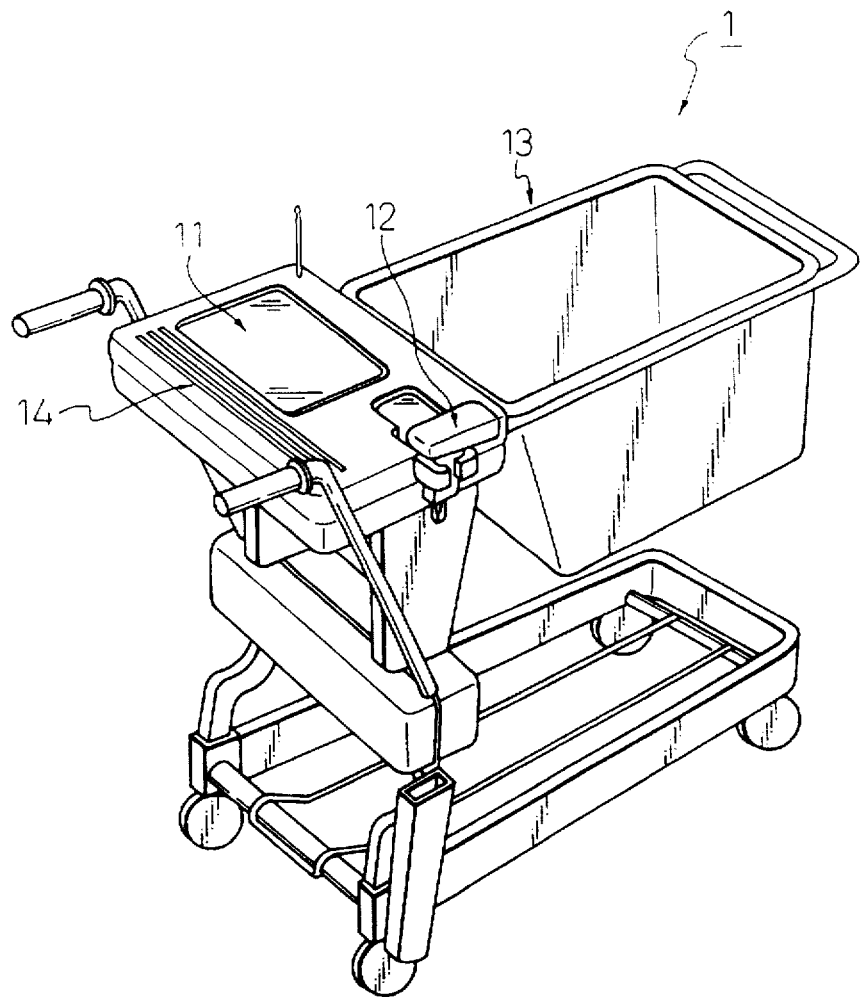
FIG. 1 is a perspective view of a self-scan cart used in a POS system according to the present invention.

FIG. 1 is a perspective view of a self-scan cart used in the present invention. A self-scan cart 1 includes a display 11, a touch scanner 12, a basket 13, and a keyboard 14. The display unit 11 is formed of a liquid crystal panel or a CRT (Cathode Ray Tube) to display information of goods and messages which are input by the customer. The touch scanner 12 is operated by the customer and used for reading the barcode of the goods. The keyboard 14 is also operated by the customer to input the article code, the amount of goods, etc. This keyboard 14 further includes a cancel button and a finish button (see, FIG. 6).

Figure 2:
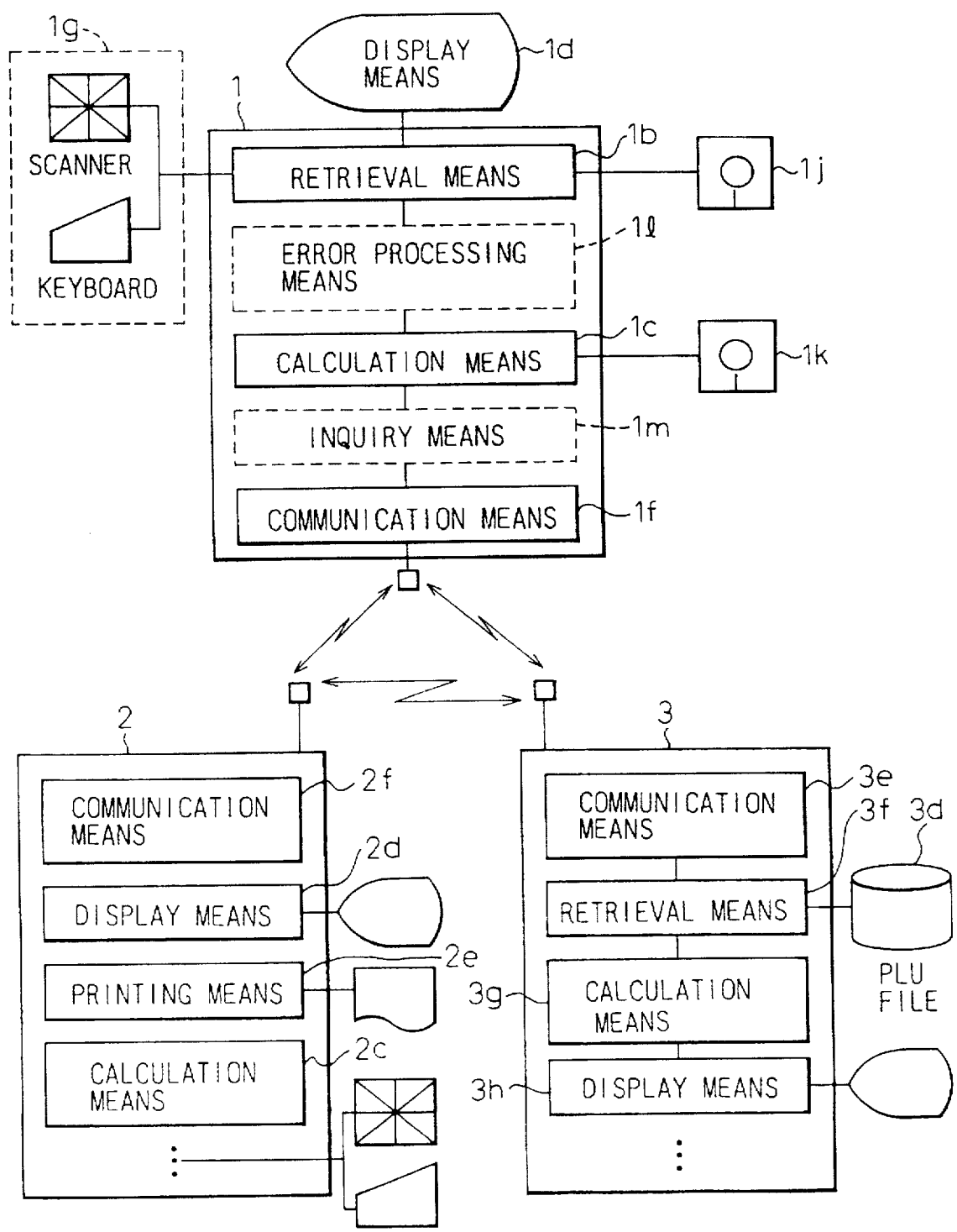
FIG. 2 is a basic block diagram of the POS system according to the present invention.

FIG. 2 is a basic block diagram of a POS system according to the present invention. In the first aspect of the present invention, the POS system includes a portable terminal for the customer (below, customer terminal) 1 which is provided on the cart, a first upper apparatus 2 which is provided in the terminal (or, adjustment POS terminal), and a second upper apparatus 3 (or, controller) which is provided within a store or in a head office.

The customer terminal 1 includes an input means 1g having the touch scanner 12 and the keyboard 14 in order to input the article code through the barcode by the customer; a PLU file 1j for storing all article codes and prices corresponding to each article code, and this PLU file is preferably formed of a floppy disk and used as a local PLU; a retrieval means 1b for retrieving information of goods, which are input by the customer, stored in the PLU file 1j; a calculation means 1c for executing calculation of subtotal, total, etc., based on the result of the retrieval means 1b; a display means 1d for displaying results of the calculation; a storage means 1k which is preferably formed of the floppy disk; and a communication means 1f for communicating with the first and second upper apparatuses 2 and 3.

The first and second upper apparatuses 2 and 3 include at least communication means 2f and 3e for communicating with the customer terminal 1. The first upper apparatus 2 further includes a display means 2d, a printing means 2e, and a calculation means 2c. The second upper apparatus 3 further includes a retrieval means 3f, a calculation means 3g, and a display means 3h. Reference number 3d denotes a PLU file having large storage capacity provided as a master PLU file.

In the second aspect of the present invention, the customer terminal 1 further includes an error processing means 11; The error processing means "11" deals with the retrieval error when the information of the desired goods is not found in the PLU file 1j of the customer terminal 1. The display means 1d displays goods which are not retrieved on the customer terminal 1. The storage means 1k stores the barcodes of the goods. The first upper apparatus 2 deals with the information for the goods which produce the retrieval error.

In the third aspect of the present invention, the customer terminal 1 further includes an inquiry means 1m and a communication means 1f. The second upper apparatus 3 includes the PLU file 3d and has a large storage capacity to store information for all the goods in the store, the retrieval means 3f and the communication means 3e. In the present invention, the inquiry means 1m of the customer terminal 1 retrieves the PLU file 3d of the second upper apparatus 3 when the information of the desired goods are not found in the PLU file 1j of the customer terminal 1.

In the fourth aspect of the invention, the communication means 1f of the customer terminal 1 and the first upper apparatus 2 include optical adaptors 1p and 2p. For the adjustment, the detailed data are transferred by connecting between the optical adaptors 1p and 2p.

Figure 3:
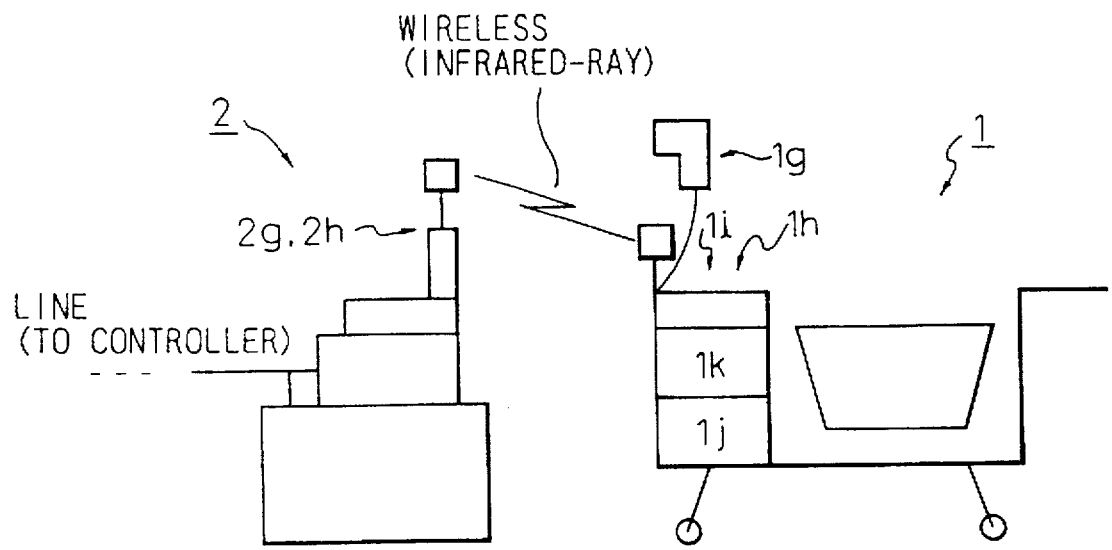
FIG. 3 is a schematic diagram of the POS system having a self-retrieval function according to the present invention.
Figure 4:
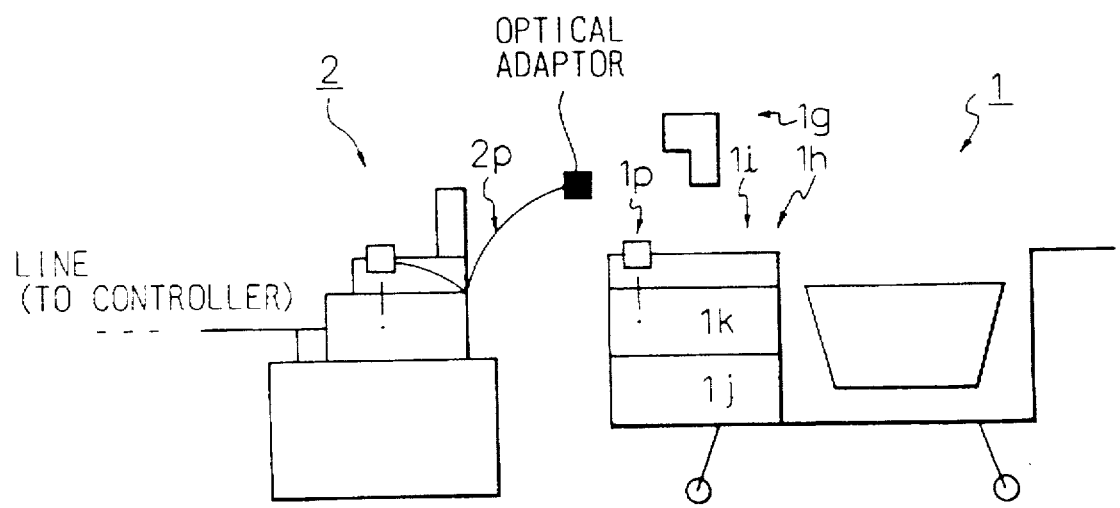
FIG. 4 is a schematic diagram of the POS system having the self-retrieval function according to an embodiment of FIG. 3.

FIG. 3 is a schematic diagram of the POS system having a self-retrieval function according to one embodiment of the present invention, and FIG. 4 is a schematic diagram of the POS system having the self-retrieval function according to another embodiment of the present invention. Further, FIG. 5 is an overall block diagram of the POS system having the self-retrieval function according to the present invention.

Figure 5:
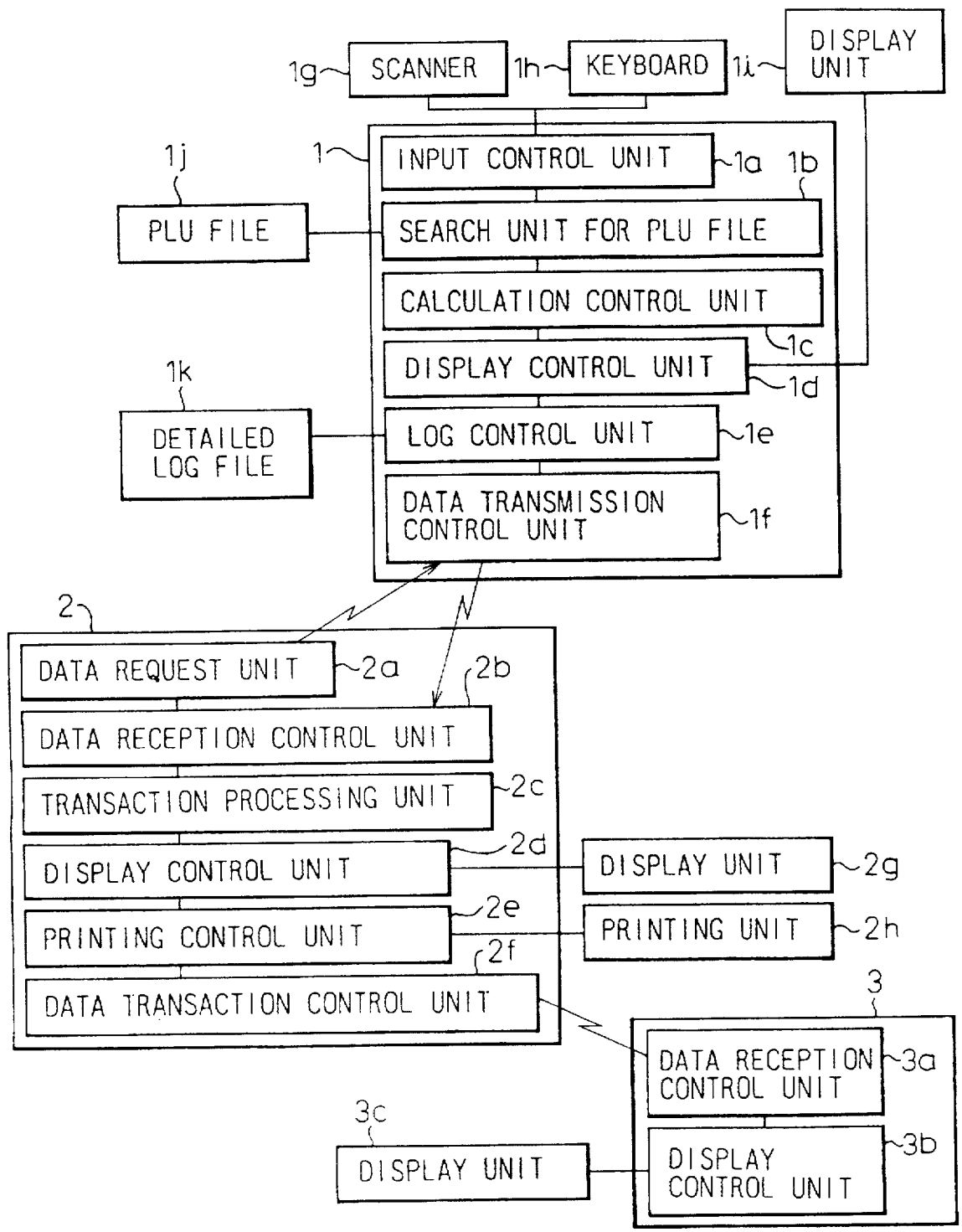
FIG. 5 is an overall block diagram of the POS system having the self-retrieval function shown in FIG. 3.

In FIGS. 3, 4 and 5, the scanner 1g reads the barcode which is attached to the article, and sends the barcode information to the PLU file search unit 1b through the input control unit 1a. The barcode includes information of the article code, and the PLU file search unit 1b retrieves the PLU file 1j based on the article code to define the article. Further, the article code includes the article name and the unit price.

The customer operates the keyboard 1h of the self-scan cart. The article code of the desired goods is manually input by the customer through the keyboard 1h. Further, the customer can cancel the undesired goods by pushing the finish button (see, FIG. 6).

The display units 1i, 2g and 3c are formed of the liquid crystal display or the CRT, and controlled by the display control units 1d, 2d and 3d. Accordingly, in accordance with the operation of the self-scan cart 1, the adjustment POS terminal 2 and the controller 3, the display unit 1d displays the name of the article, the amount of sale, the unit price, the subtotal and total prices, etc. Further, the handling steps of the self-scan cart according to the customer and the message are displayed on the display unit 1i. The input control unit 1a controls the keyboard 1h and the scanner 1g, and further controls transmission and reception of the data transferred to the calculation control unit 1c.

The PLU file search unit 1b reads the article name and prices from the PLU file 1j of the self-scan cart 1 based on the information of the article code and the barcode transferred from the input control unit 1a, and sends the article code and corresponding price to the calculation control unit 1c. The PLU file 1j of the self-scan cart 1 includes tables which are formed of the article code, and the name and price corresponding to the code. The PLU file search unit 1b searches the tables. The local PLU file 1j is formed of, for example, a RAM, a memory card, floppy disk, etc., and the contents thereof are updated every day. Further, the PLU file 1j may be formed of a hard disk apparatus or an optical disk apparatus.

The calculation control unit 1c detects a kind and the amount of the article based on the data which is read from the PLU file 1j, and obtains the total price of goods which are selected by the customer. The result is transferred to the display control unit 1d and the detailed log control unit 1e. The display control units 1d, 2d and 3b control signals among display units 1i, 2g and 3c. The calculation control unit 1c and the transaction processing unit 2c send the result of the calculation to the display units 1i, 2g and 3c. The detailed log control unit 1e sequentially sends the calculation result of the calculation control unit 1c and the detailed log of the sales to the detailed log file 1k in order to store the article code, the article name, the amount of sale, the subtotal and total prices, etc.

The detailed log file 1k stores the information of goods, i.e., the article name, the amount of the sale, the unit price, and the total price based on the article code and the barcode. These information are stored until an adjustment process is finished. Preferably, the detailed log file 1k is formed of a RAM, a memory card, a floppy disk, a harddisk, and an optical disk, etc. The information of goods which are stored in the detailed log file 1k are stored by using the barcode when the customer inputs the information from the scanner 1g. Further, the information of goods are stored by using the article code when the customer inputs the information from the keyboard 1h.

The detailed data transmission control unit 1f controls the transmission and reception of data between the self-scan cart and the adjustment POS terminal 2. The transaction data which are stored in the detailed log file 1k are transferred to the detailed data reception unit 2b through the transmission control unit 1f when the self-scan cart 1 receives the transmission request from the transmission data request unit 2a of the adjustment POS terminal 2.

Next, in the adjustment POS terminal 2, the transmission data request unit 2a sends signals to each self-scan cart 1 in order to confirm the state of the cart as to whether the selection of goods is finished by the customer. The detailed data reception control unit 2b receives the contents of the detailed log file 1k of the self-scan cart 1. The transaction data which are stored in the detailed log file 1k are transmitted to the detailed data reception control unit 2b through the detailed data transmission control unit 1f. That is, when the selection of goods is finished and the finish key is pushed by the customer, the detailed data transmission control unit 1f of the self-scan cart 1 receives the transmission request signal from the transmission data request unit 2a, and sends the contents of the detailed log file 1k to the detailed data reception control unit 2b through a predetermined communication means, for example, wireless, infrared-ray, optical fiber, etc. Then, the adjustment POS terminal 2 starts the adjustment process.

The transaction processing unit 2c includes calculation, retrieval and control functions, and performs a predetermined adjustment operation based on the data which are sent from the detailed data reception control unit 2b. For example, when the transaction processing unit 2c receives the barcode information, the transaction processing unit 2c re-retrieves and confirms the PLU file included in the adjustment POS terminal 2, and performs the adjustment process. When the transaction processing unit 2c receives the article code, the transaction processing unit 2c performs the adjustment process based on the article code.

The transaction processing unit 2c sends the result to the display the result control unit 2d in order to display on the display unit 2g. The printing control unit 2e controls the signal between the transaction processing unit 2c and the printing unit 4, and controls the printing unit 2h to issue a receipt. The printing unit 2h prints various information, for example, the article name, the unit price, the amount of sale, the subtotal and total prices, and the consumer tax, on the receipt. The printing unit 2h, also prints a small-size card which may be given to the customer.

Further, the printing unit 2h can print a particular message. The transaction data transmission control unit 2f controls transmission and reception of data between the adjustment POS terminal 2 and the transaction data reception control unit 3a of the controller 3. The transaction data adjusted by the adjustment POS terminal 2 are sent to the controller 3 through the transaction data transmission control unit 2f.

The transaction data reception control unit 3a controls the reception of data which are sent from the adjustment POS terminal 2. The transaction data which are adjusted by the adjustment POS terminal, for example, the article name and the amount of sale, are sent to the controller 3 and updated therein. As a result, the controller 3 can always hold the most recent data. Accordingly, the stock management of goods can be performed in accordance with the most recent data.

FIG. 6 shows one example of a display image on the self-scan cart according to the present invention. As shown on the display, date, member's number, and member's name are displayed on the upper portion. Further, the article code (for example, 533, 532, etc.), the article name (for example, BEER, CHEESE, etc.), the amount of sale, and the corresponding prices are displayed for every articles. Still further, the subtotal at the present time, the consumption tax, and the total price are displayed on the display unit. A "CANCEL" button is used to cancel the goods, and a "FINISH" button is used to finish the sale. Two arrow marks indicate an upward or downward scroll operation of the image on the display.

Figure 7:
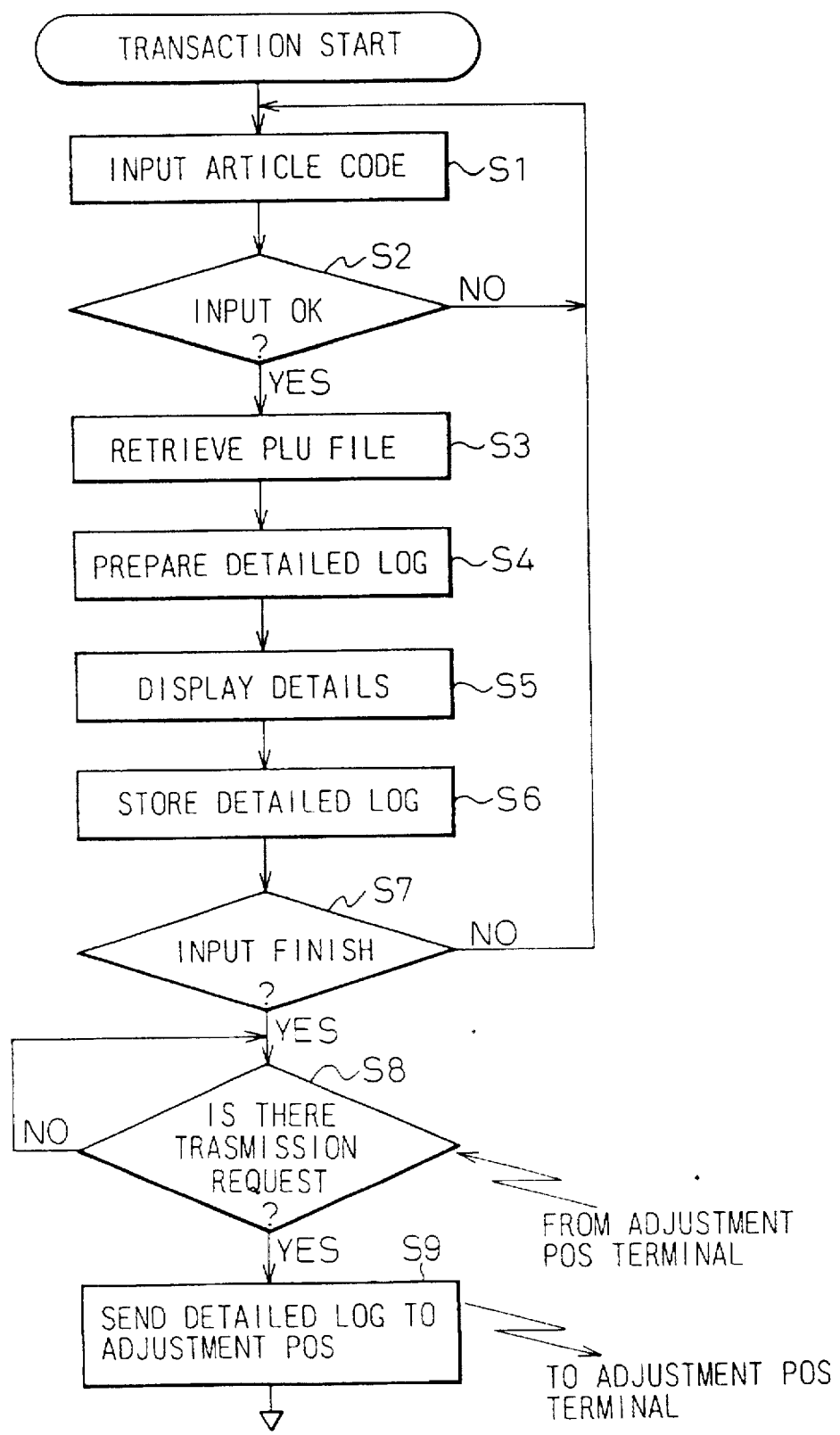
FIG. 7 is a process flowchart of the POS system having the self-retrieval function as one embodiment of FIG. 3.
Figure 8:
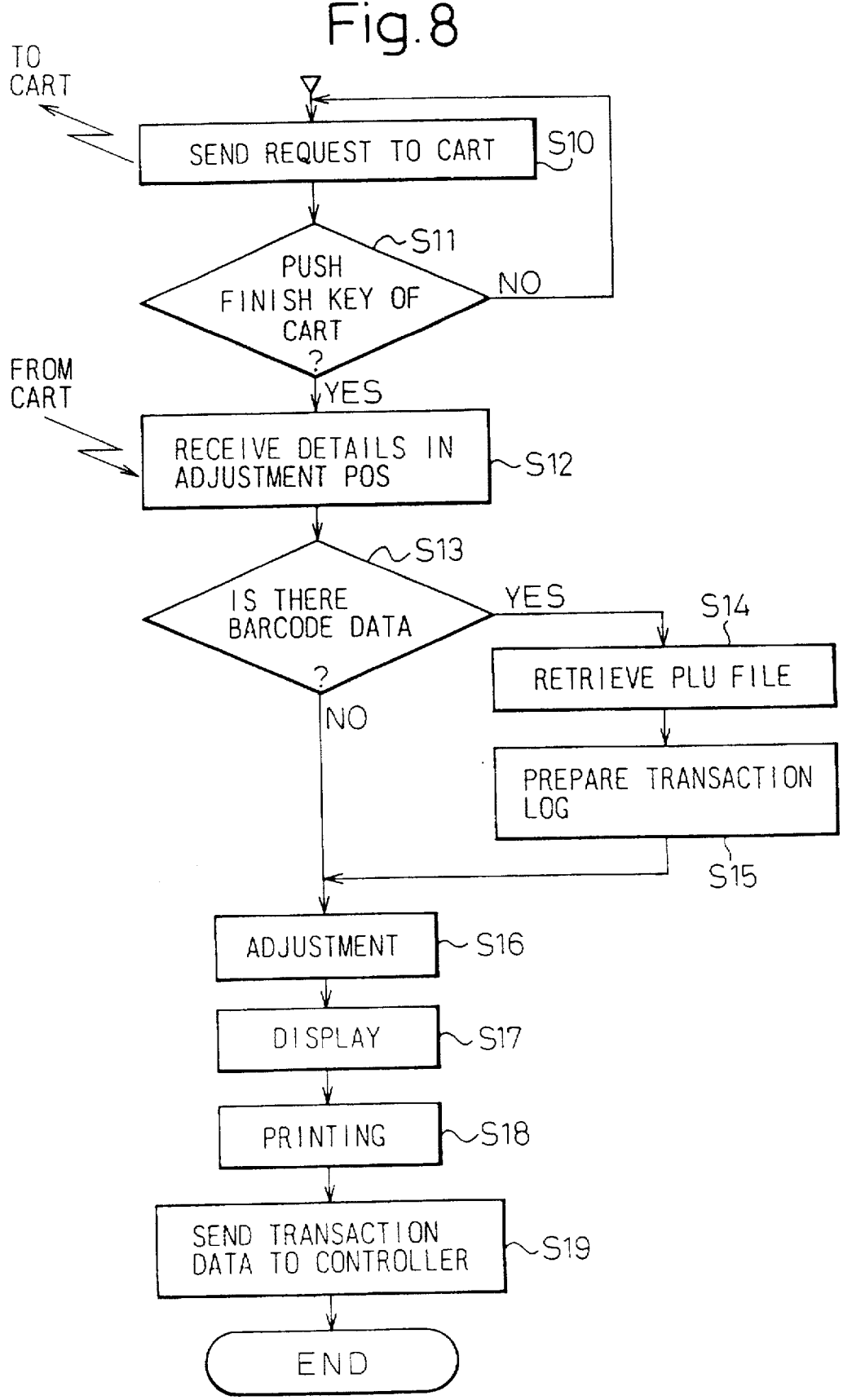
FIG. 8 is a process flowchart of the POS system having the self-retrieval function as another embodiment of FIG. 3.

FIG. 7 is a process flowchart of the POS system having the self-retrieval function as one embodiment, and FIG. 8 is a process flowchart of the POS system having the self-retrieval function as another embodiment. The transaction is started when the barcode is read by the scanner 1g of the self-scan cart 1, or when the article code is input through the keyboard 1h (step S1).

The PLU file search unit 1b of the self-scan cart 1 confirms whether the article code is normally read for every article code (step S2). When the article code is not read normally (NO), the process returns to the step S1. When the article code is input normally (YES), the PLU file search unit 1b retrieves the PLU file 1j of the self-scan cart 1 in accordance with the article code (step S3), and determines the name of the article and its price.

Next, the calculation control unit 1c calculates a subtotal based on the result of retrieval of the PLU file 1j, and prepares the detailed log which clarifies the article name, the unit price, and the subtotal (step S4). The display control unit 1d displays the detailed log prepared by the calculation control unit 1c (step S5). Next, the detailed log which is prepared in step S4 is stored by the detailed log control unit 1e into the detailed log file 1k (step S6). Further, the detailed log control unit 1e confirms whether the input operation for the desired goods are finished by the customer (step S7).

When the input operation for the desired goods are not finished (NO), the process returns to the step S1. When the input operation for the desired goods are finished (YES), the customer pushes the finish button of the keyboard 1h. When the finish button is pushed, the self-scan cart 1 is set to the state which can receive the transmission request from the adjustment POS terminal 2. Further, the detailed data transmission control unit 1f confirms whether the transmission request is generated from the adjustment POS terminal 2 to the self-scan cart 1 (step S8). When the transmission request is not generated, the step S8 is repeated.

When the detailed data transmission control unit 1f receives the transmission request from the adjustment POS terminal 2, the control unit 1f waits until the POS terminal 2 completes preparation of reception (step S11), and sends the detailed log, which is stored in the detailed log file 1k, to the adjustment POS terminal 2 (step S9). The transmission of the detailed log from the detailed log file 1k to the adjustment POS terminal 2 is performed by the wireless or the optical fiber. In the latter case, the adaptor 1p is connected to the adaptor 2p on a checkout lane of the terminal.

FIG. 8 is a process flowchart of the POS system having the self-retrieval function as another embodiment. This flowchart shows the operation in the adjustment POS terminal. The transmission data request unit 2a in the adjustment POS terminal 2 sends a transmission request to each self-scan cart 1 (step S10) to discover whether there is a self-scan cart in which the finish button is pushed.

When there is no self-scan cart in which the finish button is pushed (NO), this step S10 is repeated. When there is any one self-scan cart in which the finish button is pushed (YES), the detailed data reception control unit 2b receives the detailed log from the detailed data transmission control unit 1f (step S12). When the detailed data reception control unit 2b receives the detailed log, the transaction processing unit 2c performs the completion process for the transaction. That is, the transaction processing unit 2c checks whether the article codes of the detailed log file 1k are input from the barcode data (step S13). When the detailed log file 1k is input from the barcode data (YES), the transaction processing unit 2c retrieves and confirms with the PLU file of the adjustment POS terminal 2 for all goods which are input (step S14), and prepares the transaction detailed log file based on a result of the above retrieval (step S15). Further, the transaction processing unit 2c performs the adjustment process (step S16).

The adjustment process in the adjustment POS terminal 2 is performed by retrieving the PLU file of the adjustment POS terminal 2 in accordance with the barcode or the article code, which is input from the self-scan cart 1, regardless of presence of the information on goods in the PLU file 1j. When the detailed log file 1k is input in accordance with the article code, the adjustment process is performed in accordance with the article code (step S16). Next, the display control unit 2b displays the result of calculation in the transaction processing unit 2c to the display unit 2g (step S17). The printing control unit 2e then controls the printing unit 2h and prints the result of the transaction (step S18).

Next, the transaction data transmission control unit 2f sends the result of the transaction to the transaction data reception control unit 3a of the controller 3 (step S19). Accordingly, the controller 3 is updated so that it always holds the most recent information therein.

The adjustment processes in the POS system, which includes a self-retrieval function, are executed as explained above. As a result, the customer always can know the goods and the corresponding total prices which are bought by customer himself, and also a total expected price range. Further, since it is not necessary to search the controller 3 in order to retrieve the goods, the load (retrieval, calculation, etc.) in the computer system can be considerably reduced so that the computer can cover many self-scan carts within the store. Still further, since the customer inputs the information of the desired goods from the self-scan cart 1, it is possible to considerably reduce the adjustment work by an operator at the terminal. As a result, it is possible to reduce the customer's waiting time.

Figure 9:
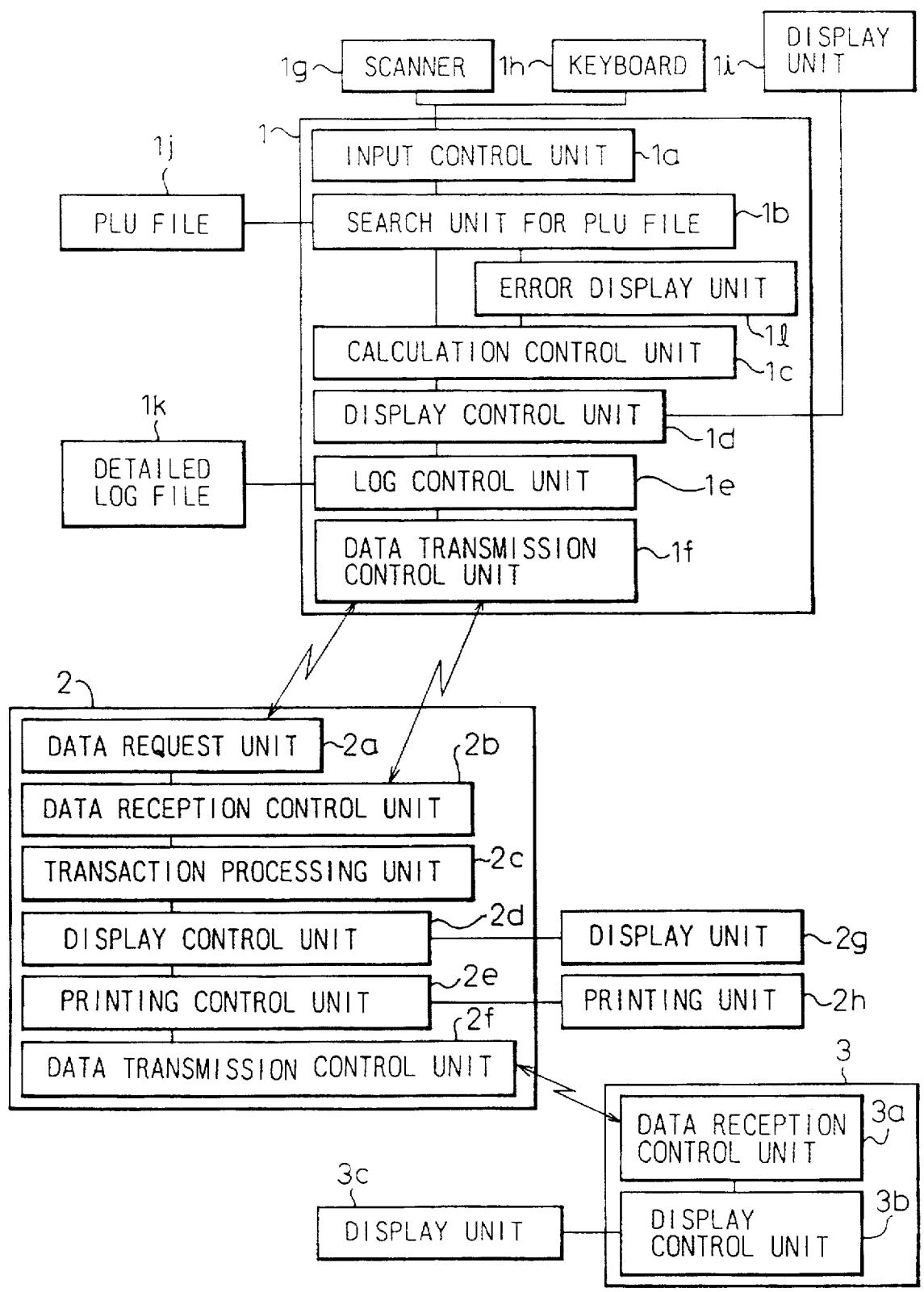
FIG. 9 is an overall block diagram of the POS system having an error processing function according to the present invention.

FIG. 9 is an overall block diagram of the POS system having an error processing function according to the present invention, and FIG. 10 shows one example of a display image on the self-scan cart in FIG. 9. In this embodiment, the self-scan cart 1 further includes a PLU error processing unit 11. When the PLU file search unit 1b retrieves the PLU file 1j and cannot find the article data, the search unit 1b generates the retrieval error. The PLU error processing unit 11 processes the retrieval error as explained below. Since the storage capacity of the PLU file 1j of the self-scan cart 1 is small because of use of the floppy disk, only article codes of popular (or main) goods are stored in the PLU file 1j.

First, the PLU file search unit 1b searches the PLU file 1j provided in the self-scan cart 1. When the desired article is not found in the PLU file 1j, the PLU error processing unit 11 processes the retrieval error. The PLU error processing unit 11 sends the barcode and amount of goods to the detailed log file 1k, and the detailed log file 1k stores these data. The PLU error processing unit 11 further edits these data in order to display on the display unit 1i as shown in FIG. 10. In FIG. 10, the symbol "*" indicates that the goods, which cannot retrieve and cannot define the price in the self-scan cart 1, are contained. On the other hand, the detailed log file 1k in the self-scan cart 1 stores only the barcode and the number of the articles which it cannot retrieve.

The adjustment POS terminal 2 reads barcodes of all goods which are stored in the detailed log file 1k in the self-scan cart 1, and the barcodes are re-retrieved by the PLU file in the adjustment POS terminal 2. Further, the adjustment POS terminal 2 processes the goods which are displayed as the error, and performs the adjustment for all goods.

As is obvious from the above explanation, it is not necessary to have the data for all goods in the PLU file 1j of the self-scan cart 1. When the desired goods are not found in the PLU file 1j, the data is obtained from the PLU file of the adjustment POS terminal 2. Accordingly, the PLU file 1j of the self-scan cart 1 needs to store only popular (or main) goods. Further, it is possible to minimize the storage capacity of the PLU file 1j and to easily perform an update of the data in the PLU file 1j. Still further, since the adjustment process is performed based on the barcodes which are input by the customer, it is possible to raise efficiency of the adjustment work by the operator at the terminal (i.e., cash register) so that it is possible to reduce the customer's waiting time in the terminal.

Figure 11:
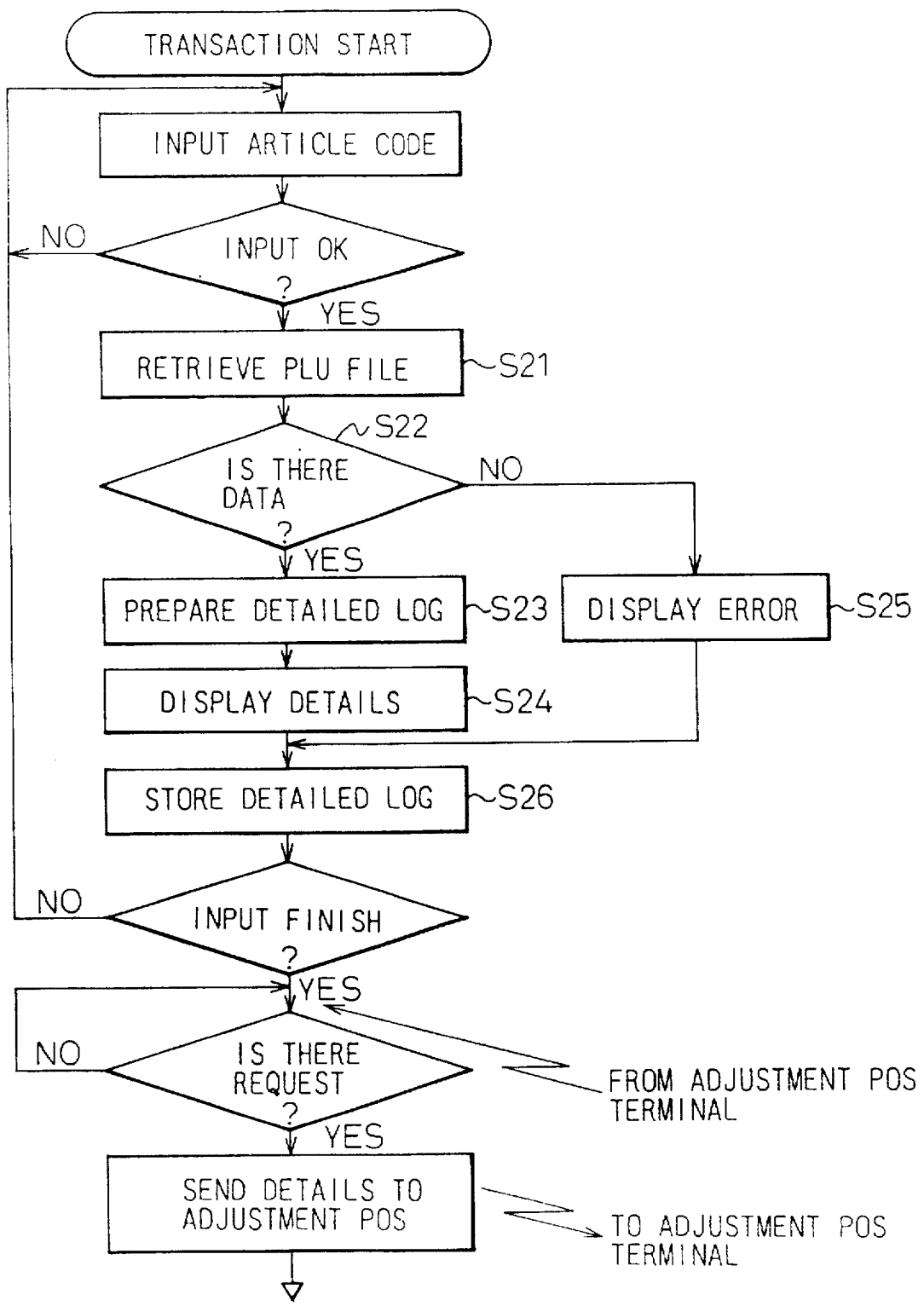
FIG. 11 is a process flowchart of the POS system having the error processing function as one embodiment of FIG. 9.
Figure 12:
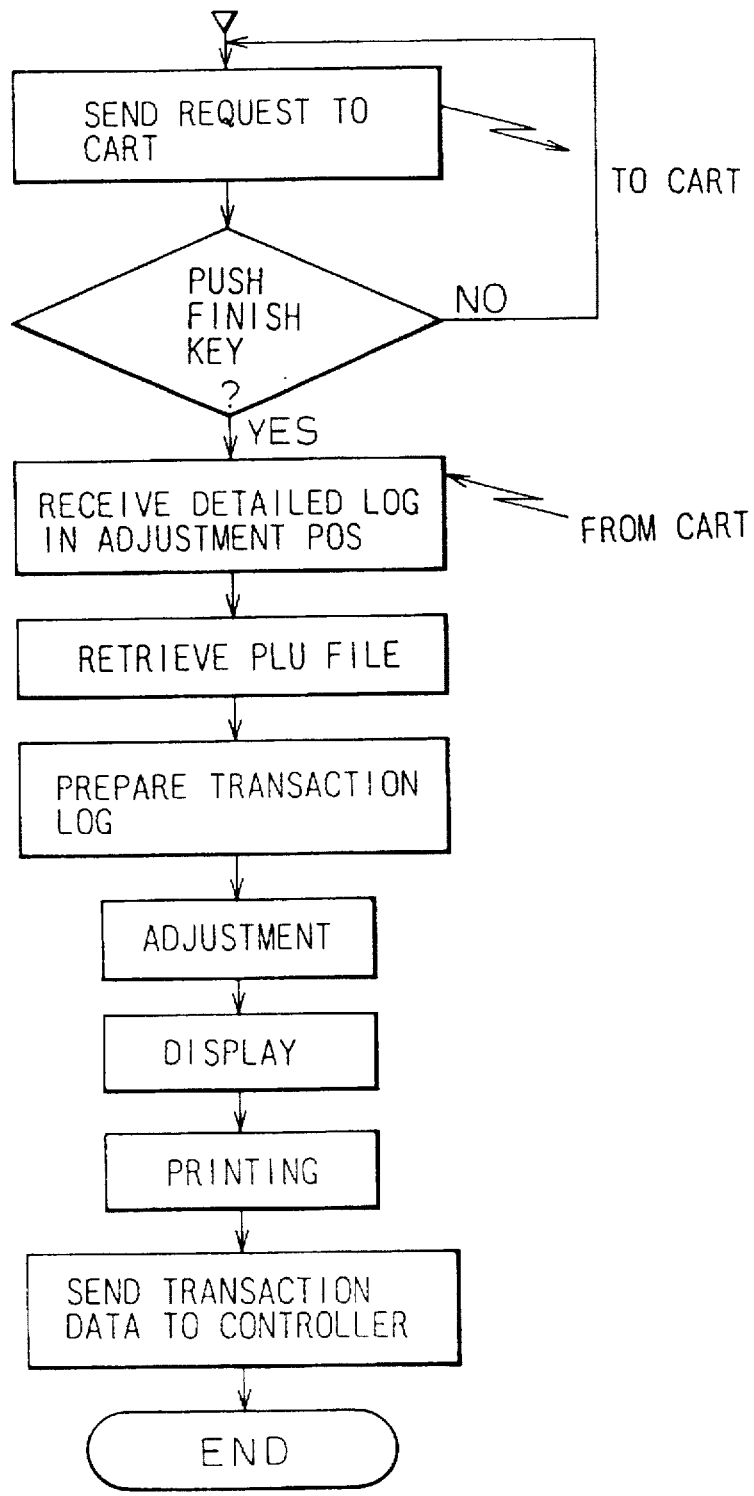
FIG. 12 is a process flowchart of the POS system having the error processing function as another embodiment of FIG. 9.

FIG. 11 is a process flowchart of the POS system having the error processing function as one embodiment of FIG. 9, and FIG. 12 is a process flowchart of the POS system having an error processing function as another embodiment of FIG. 9. FIG. 11 shows a process flowchart in the self-scan cart, and FIG. 12 shows a process flowchart in the adjustment POS terminal. The flowchart of FIG. 11 is very similar to that of FIG. 7. Accordingly, only the different portions are explained below.

As a result of retrieval of the PLU file 1j (step S21), when there are corresponding data in the PLU file 1j (YES, in step S22), the following steps from the step S23 are the same steps as steps S4 to S9 of FIG. 7. When there are no corresponding data in the PLU file 1j (NO, in step S22), an error message is displayed on the display unit. Further, the barcode information and the number of sale are stored in the detailed log file 1k (step S26). As shown in FIG. 10, the symbol "*" indicates that goods which cannot be priced are in the self-scan cart 1. Further, the following comment is displayed on the display unit, i.e., "the symbol '*' attached on the subtotal and total indicates goods which cannot be priced".

As shown in FIG. 12, this process flowchart is the same as that of FIG. 8 except for the step S13 of FIG. 8. The adjustment process in the adjustment POS terminal 2 re-retrieves the PLU file in accordance with the barcodes for all goods which are sent from the self-scan cart 1, and performs the adjustment process. In this case, the adjustment process in the adjustment POS terminal 2 retrieves the PLU file in accordance with the barcode and the article code, which are input from the self-scan cart 1, regardless of the presence of the information of the PLU file 1j of the self-scan cart 1.

Figure 13:
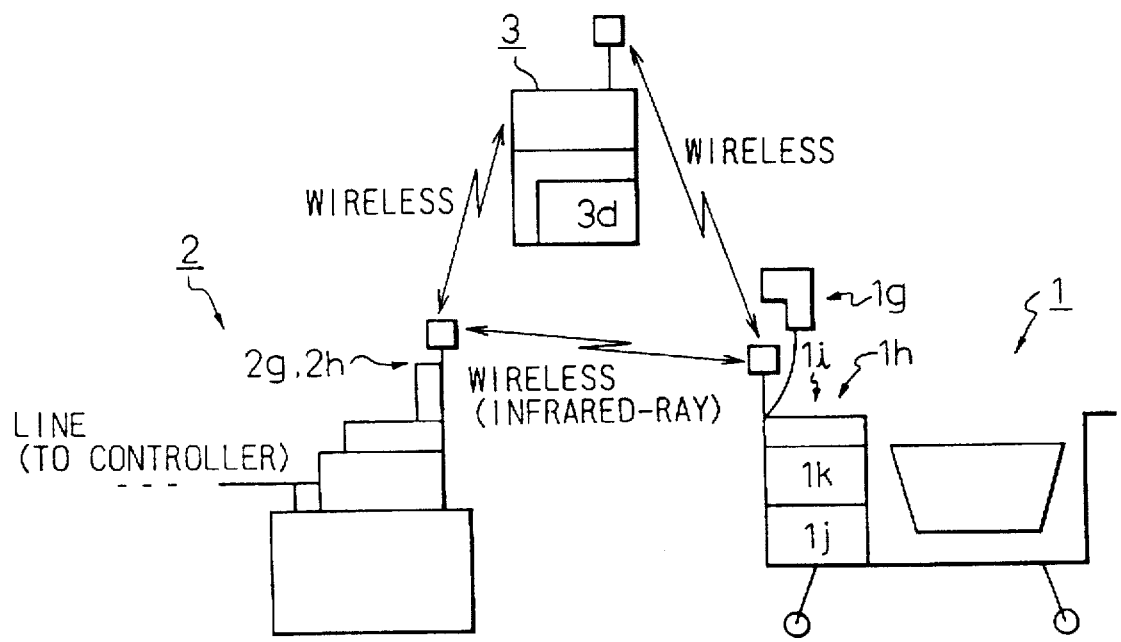
FIG. 13 is a schematic diagram of the POS system having an inquiring function to a controller according to the present invention.
Figure 14:
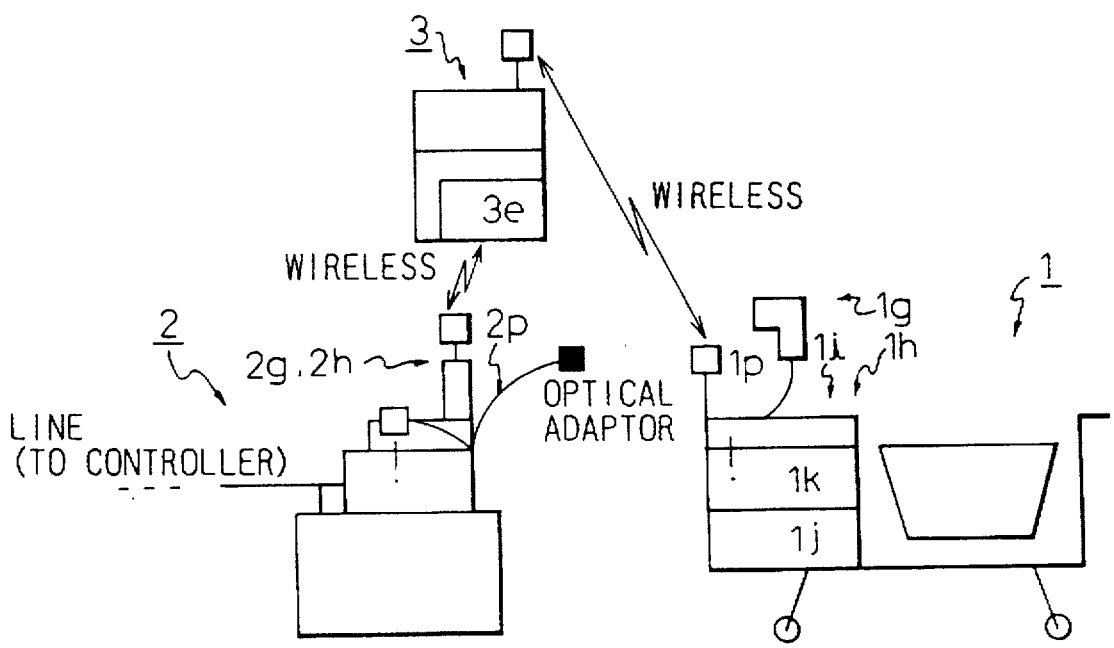
FIG. 14 is a schematic diagram of the POS system having the inquiry function to the controller shown in FIG. 13.

FIG. 13 is a schematic diagram of the POS system having an inquiry function to a controller according to the present invention, and FIG. 14 is a schematic diagram of the POS system having the inquiry function to the controller shown in FIG. 13. In the inquiry function, first, the information of goods, which are input by the customer, are retrieved from the PLU file 1j in the self-scan cart 1. Second, when the desired goods are not found in the PLU file 1j of the self-scan cart 1, the desired goods are retrieved from the PLU file 3d in the controller 3. That is, the PLU file 1j has a priority over the PLU file 3d when retrieving the goods.

As shown in FIG. 13, preferably, a wireless (or, infrared-ray) communication system is used to communicate between the self-scan cart 1 and the adjustment POS terminal 2. Further, as shown in FIG. 14, optical adaptors 1p and 2p may be used to communicate between the self-scan cart 1 and the adjustment POS terminal 2 instead of the wireless or infrared-ray. As shown in FIGS. 13 and 14, only wireless system is used to communicate between the self-scan cart 1 and the controller 3, and between the adjustment POS terminal 2 and the controller 3.

FIGS. 15A and 15B are overall block diagrams of the POS system having the inquiry function to the controller shown in FIG. 13. In FIGS. 15A and 15B, the PLU inquiring control unit 1m is provided instead of the PLU error processing unit 11 of FIG. 9. Further, there are provided in the controller 3, the transmission control unit 3e used for reception of the inquiry and transmission of the result of the PLU, the PLU file search unit 3f, and the PLU file 3d. As is obvious, the above components are not provided in FIG. 9.

In the structure shown in FIGS. 15A and 15B, first, the PLU file search unit 1b retrieves the PLU file 1j in the self-scan cart 1. Second, when the desired information is not found in the PLU file 1j, this information is processed in the PLU inquiring control unit 1m. Further, the PLU inquiring control unit 1m edits an inquiry list (telegram) of the corresponding goods based on the article code or barcode information, and transmits the inquiry list to the transmission control unit 3e of the controller 3 through the wireless communication system. Still further, the PLU inquiring control unit 1m receives the goods information from the transmission control unit 3e.

When the transmission control unit 3e receives the inquiry list from the inquiring control unit 1m, the inquiry list is sent to the file search unit 3f for the PLU file. Further, when the transmission control unit 3e receives the result of the retrieval at the PLU file search unit 3f, the results are sent to the inquiry control unit 1m of the self-scan cart 1. The PLU file 3d stores a table which indicates the relationship between article codes and barcodes for all goods, the article names, and the prices. The PLU file search unit 3f retrieves the PLU file 3d.

In FIGS. 15A and 15B, when the result of the retrieval by the PLU file search unit 3f is sent to the transmission control unit 3e of the controller 3, the transmission control unit 3e of the controller 3 sends the result to the inquiry control unit 1m, and further the result is sent to the calculation control unit 1c. The following processes are the same as in the first embodiment.

Figure 16:
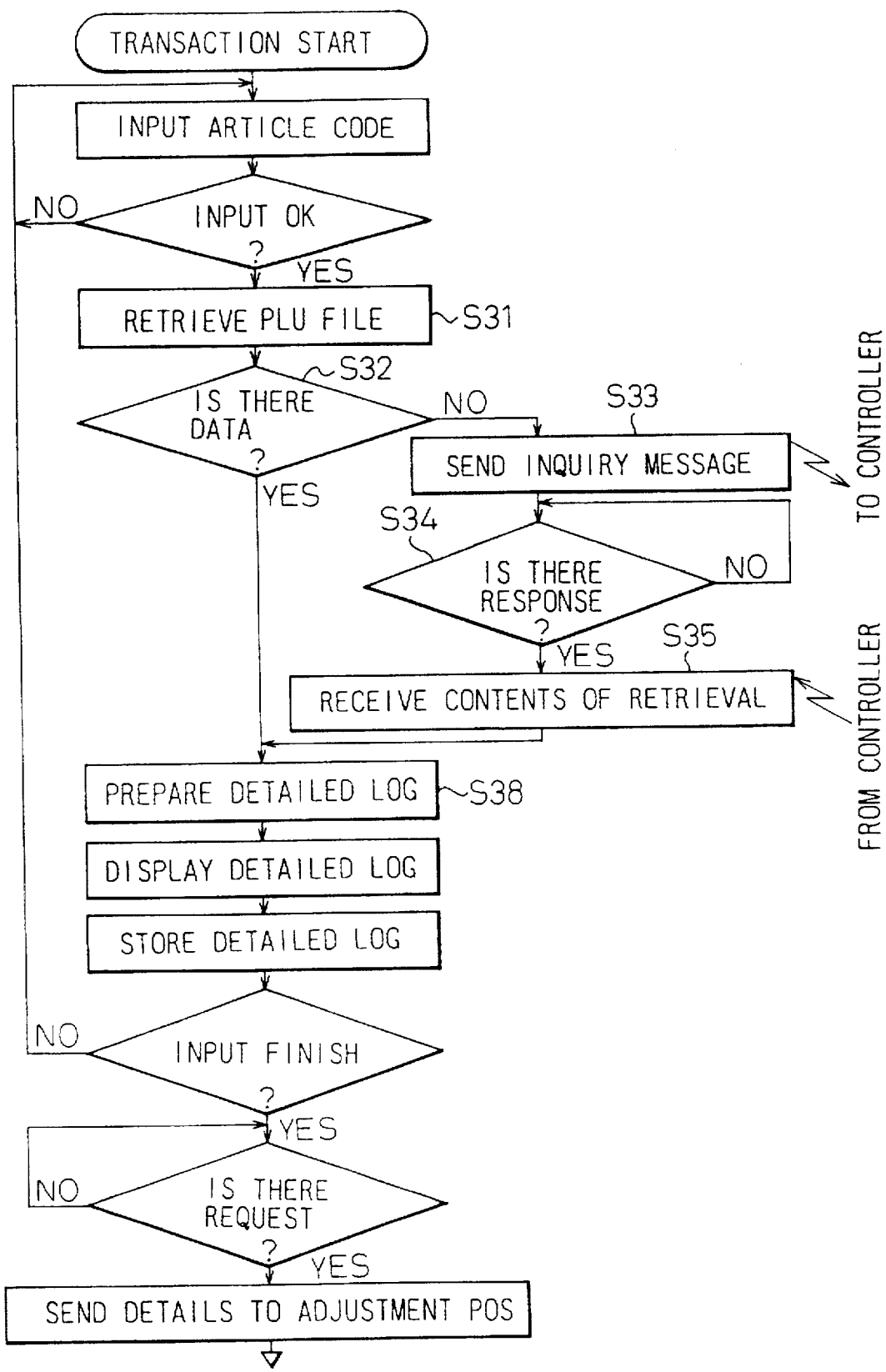
FIG. 16 is a process flowchart of the POS system having the inquiry function to the controller as one embodiment of FIG. 13.
Figure 17:
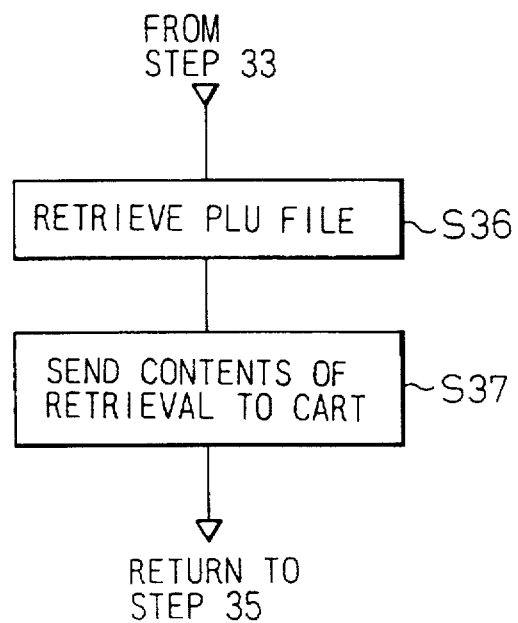
FIG. 17 is a process flowchart of the POS system having the inquiry function to the controller as another embodiment of FIG. 13.

FIG. 16 is a process flowchart of the POS system having the inquiry function to the controller as one embodiment of FIG. 13. FIG. 17 is a process flowchart of the POS system having the inquiry function to the controller as another embodiment of FIG. 13, and FIG. 18 is a process flowchart of the POS system having the inquiry function to the controller as still another embodiment of FIG. 13.

As the result of retrieval of the PLU file 1j of the self-scan cart 1, when the desired goods are not found in the PLU file 1j, the self-scan cart 1 retrieves the PLU file 3d of the controller 3 as explained below. As is obvious, this process flowchart is the same as that of FIG. 7 except that the steps S32, S33, S34, and S35 are added thereto.

The PLU file search unit 1b retrieves the PLU file 1j (step S31), and determines whether or not there is corresponding data in the PLU file 1j. When there is corresponding data (YES, in step S32), the following processes are the same as the steps S4 to S9 of FIG. 7. When there are no corresponding data (NO, in step S32), the inquiring control unit 1m of the self-scan cart 1 prepares the inquiry list, and the inquiry list are sent to the transaction control unit 3e of the controller 3.

The transmission control unit 3e of the controller 3 receives the inquiry list, and sends them to the PLU file search unit. The file search unit 3f retrieves the PLU file 3d (step S36). The data for all goods, which are handled in the store, are stored in the PLU file 3d of the controller 3. When the data are found, the data send to the inquiry control unit 1m of the self-scan cart 1 through the transmission control unit 3e (step S37).

The inquiry control unit 1m of the self-scan cart 1 waits for the response from the controller 3 after the inquiry list are sent to the controller 3 and until the response are received from the controller 3 (step S34). When the inquiry control unit 1m of the self-scan cart 1 receives the response from the controller 3, the inquiry control unit 1m receives the contents of retrieval message (step S35) and prepares a detailed log file 1k (step S38). The following steps are the same as the first embodiment. Accordingly, since the data for all goods are stored in the detailed log file of the self-sacn cart 1, the adjustment POS terminal 2 can utilize the data received from the self-scan cart 1 without any change when performing the adjustment process.

In the above embodiment, although the controller 3 is provided as the host apparatus in order to execute inquiry function, it is possible to provide the inquiry function at the adjustment POS terminal 2. According to the present invention, the PLU file 1j of the self-scan cart 1 stores only information as to the main or popular goods so that it is possible to save the capacity of the storage means and reduce the size of the apparatus.

We claim:

1. A POS (Point of Sale) system comprising:
 a portable terminal comprising:
  input means operable by a customer for inputting a first article code,
  a local price look-up (PLU) file storing article codes and corresponding article information,
  receiving and retrieving means for receiving the first article code from the input means and retrieving corresponding first article information from the local PLU file,
  portable terminal calculation means for performing calculation processes in accordance with the first article information and outputting a corresponding calculation result,
  display means for displaying the first article information and the calculation result,
  storage means for storing the first article information and the calculation result, and
  portable terminal communication means for transmitting the first article information stored in the storage means in response to a customer operation; and
 an adjustment terminal comprising:
  adjustment terminal communication means for receiving the first article information transmitted by the portable terminal communication means, and
  adjustment terminal calculation means for performing an adjustment process based upon the received first article information from the portable terminal.

2. A POS system as claimed in claim 1, wherein said portable terminal is provided on a shopping cart which is handled by the customer within the store.

3. A POS system as claimed in claim 1, wherein said portable terminal is provided on a shopping basket which is carried by the customer within the store.

4. A POS system as claimed in claim 1, wherein said portable terminal further comprises:
 error processing means for responding to a condition when second article information corresponding to a second article code input by said input means cannot be retrieved from the local PLU file of the portable terminal by displaying a comment on the display means, and storing the second article code in an inquiry list in the storage means.

5. A POS system as claimed in claim 4 further comprising:
 a controller,
 wherein said portable terminal further comprises:
  inquiry list sending means for sending the inquiry list from the storage means of the portable terminal to the controller.

6. A POS system as claimed in claim 5, wherein said controller comprises:
 a master PLU file storing article codes and corresponding article information for goods in a store;
 controller retrieving means for retrieving second article information from the master PLU file in accordance with the second article code communicated in the inquiry list from the inquiry list sending means of the portable terminal; and
 controller communication means for sending the second article information to the portable terminal.

7. A POS system as claimed in claim 5, wherein communication between the adjustment terminal and the controller is performed by way of a wireless communication system.

8. A POS system as claimed in claim 5, wherein communication between the portable terminal and the controller is performed by way of a wireless communication system.

9. A POS system as claimed in claim 1 wherein said input means is a barcode scanner and a keyboard both operated by the customer.

10. A POS system as claimed in claim 1, wherein communication between the portable terminal and the adjustment terminal is performed by way of a wireless communication system.

11. A POS system as claimed in claim 1, wherein communication between the portable terminal and the adjustment terminal is performed via optical fibers.

12. A POS system as claimed in claim 1, wherein communication between the portable terminal and the adjustment terminal is performed by way of an infrared-ray communication system.

* * * * *

UNITED STATES PATENT AND TRADEMARK OFFICE
CERTIFICATE OF CORRECTION

PATENT NO. : 5,734,839
DATED : March 31, 1998
INVENTOR(S) : Shigeki ENOKI et al.

It is certified that error appears in the above-indentified patent and that said Letters Patent is hereby corrected as shown below:

Col. 1,     line 17, after "function" insert --,--;
             line 35, change "arts" to --art--.

Col. 4,     line 40, change "11" to --1$\ell$--;
             line 41, change "11" to --1$\ell$--.

Signed and Sealed this

Twelfth Day of October, 1999

Attest:

Q. TODD DICKINSON

*Attesting Officer*      *Acting Commissioner of Patents and Trademarks*